United States Patent [19] [11] 4,305,182

Peterson [45] Dec. 15, 1981

[54] SPRING RETAINER STRIP FOR ATTACHING A LINER AND GASKET TO A REFRIGERATOR DOOR

[75] Inventor: Francis C. Peterson, St. Charles, Ill.

[73] Assignee: Illinois Tool Works Inc., Chicago, Ill.

[21] Appl. No.: 151,844

[22] Filed: May 21, 1980

[51] Int. Cl.[3] .......... F16L 33/12

[52] U.S. Cl. .......... 24/289; 24/297; 24/213 R; 49/494

[58] Field of Search .......... 24/73 MF, 213 R, 213 B, 24/213 C; 49/493, 494

[56] References Cited

U.S. PATENT DOCUMENTS

| | | | |
|---|---|---|---|
| 2,100,017 | 11/1937 | van Uum | 24/213 B |
| 2,128,004 | 8/1938 | Lombard | 24/73 MF |
| 2,130,017 | 9/1938 | Lewis | 49/494 |
| 2,196,417 | 4/1940 | Kelsen | 24/73 MF |
| 2,265,957 | 12/1941 | Tinnerman | 24/213 B |
| 2,451,591 | 10/1948 | Tinnerman et al. | 24/213 B |
| 2,584,813 | 2/1952 | Poupith | 24/73 MF |
| 2,629,157 | 2/1953 | O'Herron | 24/213 B |
| 2,682,693 | 7/1954 | Poupith | 24/73 MF |
| 2,698,472 | 1/1955 | Knohl | 24/73 MF |
| 2,825,948 | 3/1958 | Parkin | 24/213 B |
| 2,964,814 | 12/1960 | Parkin | 24/73 MF |
| 3,119,299 | 1/1964 | Sarafinas | 24/73 MF |
| 3,225,952 | 12/1965 | Stiles | 217/65 |

FOREIGN PATENT DOCUMENTS

| | | | |
|---|---|---|---|
| 593927 | 3/1960 | Canada | 24/73 MF |
| 1126218 | 11/1956 | France | 24/73 MF |

*Primary Examiner*—Victor N. Sakran
*Attorney, Agent, or Firm*—J. R. Halvorsen; T. W. Buckman

[57] ABSTRACT

A spring retainer strip for releasably securing a liner and a gasket to the inner face of a refrigerator door. The retainer strip has a length which is generally equal to that of the gasket to be secured and a width which is somewhat less than that of the gasket. The retainer strip has a rectangular body portion with a plurality of spaced fingers extending from one side of the body. The retainer strip can be moved from a first to a second staging position to effect clamping of the liner and gasket to the refrigerator door. Return to the first staging position facilitates removal and replacement of the linear and the gasket. A method of assembly is also disclosed.

9 Claims, 11 Drawing Figures

SPRING RETAINER STRIP FOR ATTACHING A LINER AND GASKET TO A REFRIGERATOR DOOR

BACKGROUND AND BRIEF DESCRIPTION OF THE INVENTION

Presently, liners and gaskets are attached to the inside surface of a refrigerator door using threaded fasteners and reinforcing strips of some type. This technique requires that a workman deflect a portion of the gasket out of the way, position the reinforcing strip and then install 60 or more fasteners using a power tool to secure the two gaskets to the two doors which cover the cooling and freezing compartments. Needless to say, such a fastening technique requires a large amount of time for the laborer to complete and does not readily adapt itself to automation. Further, when the gasket loses its flexibility, tears, or the like, and requires replacement, this laborious, time consuming procedure must be repeated twice in removing the old gasket and replacing it with a new one.

The present invention overcomes the above problems by providing a spring retainer strip that can be positioned in either of two staging positions and quickly and easily moved to the other staging position. This permits easy installation and replacement of gaskets and/or liners.

The spring retainer strip comprises a generally rectangular body portion which extends the length of the gasket portion to be secured and a plurality of generally U-shaped spring fingers spaced along and projecting from one side face of the body portion. The spring fingers can take any of several forms including that of a bi-stable spring member or of a resilient expansion finger which, in its retention mode, has a dimension which exceeds the length of the opening it occupies. The spacing of the spring fingers corresponds to the spacing of openings in both the panel of the refrigerator door and in the liner. Each spring strip configuration has means to permit the clamping force exerted by the strip to be easily disengaged.

This spring retainer strip permits a novel assembly method to be employed. The liner can be placed with its apertures generally overlying those in the door panel. The spring strips can then be positioned in a so called first staging position in which the spring fingers are inserted in the aligned apertures of the liner and the door panel and serve to retain the liner against shifting. In this position, the body portion of each of the retainer strips lies at some distance from the side face of the door permitting the gasket to be positioned with a portion thereof underlying the body of each strip. The strips may then be shifted to a second staging position in which the gasket and liner are resiliently but firmly clamped to the side face of the refrigerator. Easy gasket replacement can be effected by merely shifting the spring strips back to their first staging positions utilizing the means provided.

Other features and advantages of the present invention will be better understood after a reading of the following specification taken in conjunction with the appended drawings.

DETAILED DESCRIPTION

Figure 1:
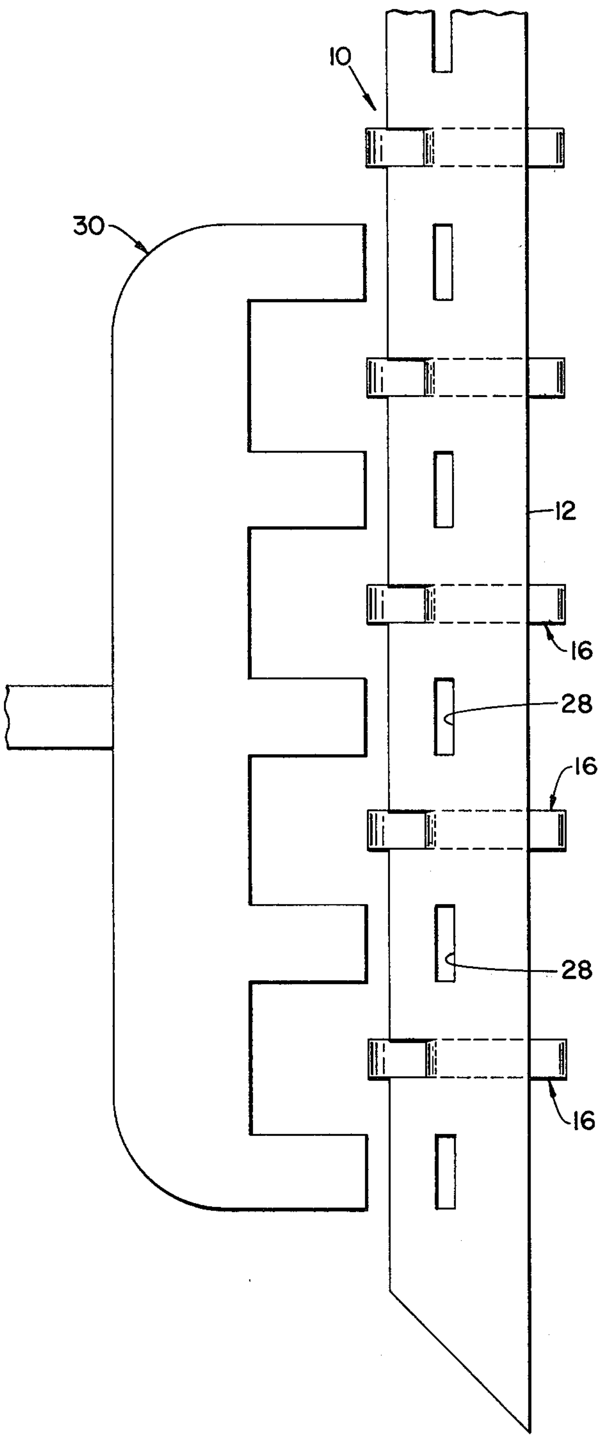
FIG. 1 is a top elevational view of a portion of one embodiment of the spring retainer strip of the current invention.

In each of the Figures, the spring retainer strip is shown generally at 10. In the embodiment depicted in FIGS. 1–5, each of the spring strips comprises a bi-stable spring. Rectangular body portion 12 has a length which substantially corresponds to that of gasket 14 but whose width is substantially less than that of the gasket. A plurality of U-shaped spring fingers 16 are each joined to the body portion 12 by one arm 17 of the "U" and project from one side face 11 of the body 12. The other arm 18 of each "U" is the means which engage the rear side 19 of the inside panel 20 of the refrigerator door through a plurality of spaced apertures 22 and through spaced apertures 26 in liner 24 to assist in the clamping.

Figure 2:
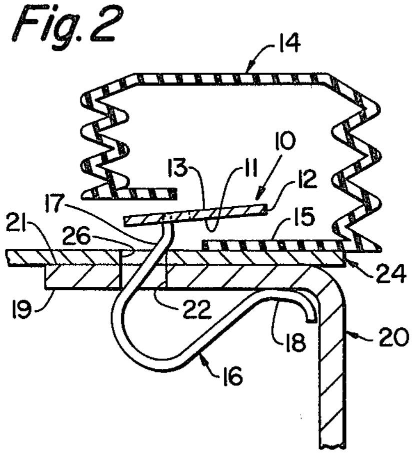
FIG. 2 is an end cross-sectional view of the FIG. 1 embodiment shown in the first staging position.
Figure 3:
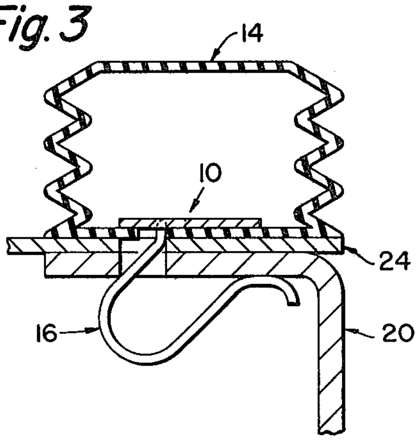
FIG. 3 is an end cross-sectional view taken along lines III—III of FIG. 4 showing the retainer strip assembled in the second staging position.

As shown in FIG. 2, the bi-stable spring strip 10 is capable of remaining in a first staging position in which the body portion 12 is spaced some distance from the front side 21 of the inside panel 20 of the door. In this manner, gasket 14 can be positioned around the periphery of the door panel 20 with the portion 15 thereof underlying the body 12 of spring strip 10. The bi-stable spring strip 10 is then moved to its second staging position in which the gasket 14 and liner 24 are clampingly engaged to the front side 21 of the inside panel 20 as shown in FIG. 3. This movement can be accomplished by engaging body portion 12 with a structural member (not shown) with sufficient force to cause the spring strip to snap to its second position.

Figure 5:
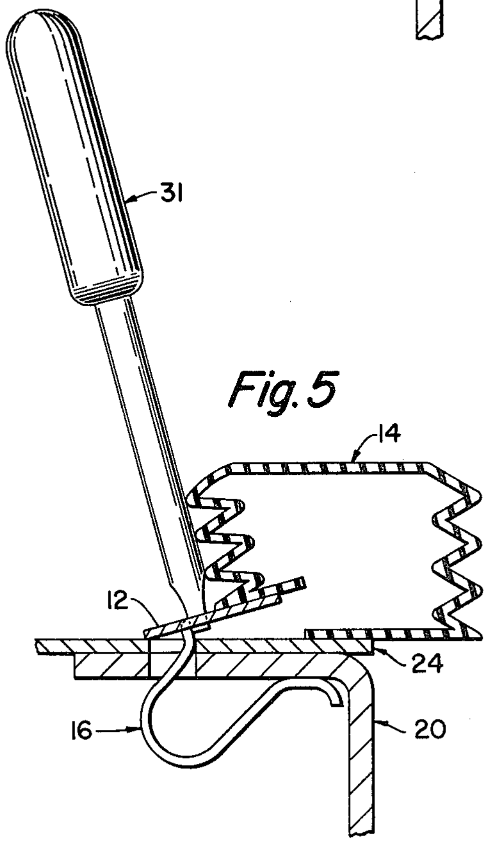
FIG. 5 is an end cross-sectional view showing how the retainer strip may be returned to the first staging position to permit replacement of the gasket and liner.
Figure 4:
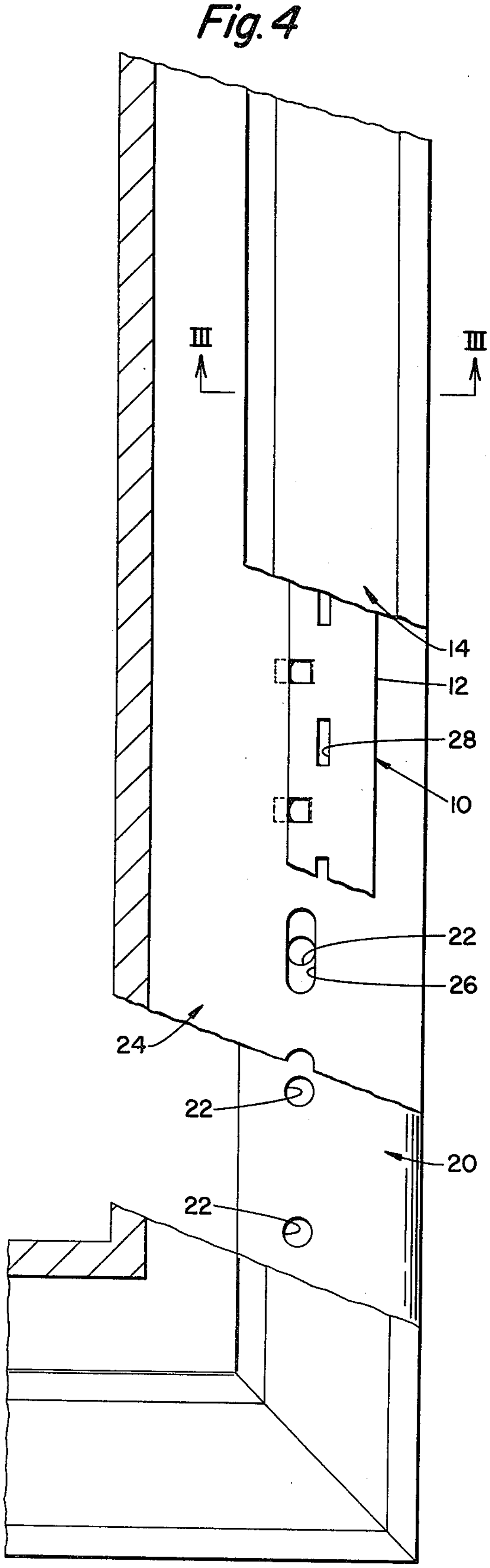
FIG. 4 is a front elevational view of a portion of the refrigerator door panel with parts broken away.

Of course, the gasket and liner can be easily replaced by deflecting the spring strip back to the first staging position as shown in FIG. 5. Means are provided permitting movement to said first staging position to release the clamping, said means being engageable from the side face 13 of the strip which is opposite to the one from which fingers 16 extend. In this embodiment, said means comprises a plurality of slots 28 in the body 12 which may be engaged by a tool such as that shown generally at 30 or by a conventional screwdriver 31 to deflect the bi-stable spring to the first staging position and release the clamping.

Figure 6:
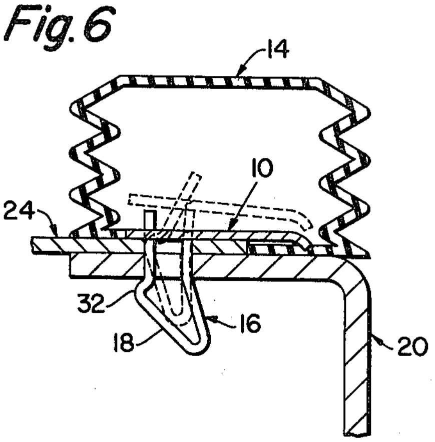
FIG. 6 is an end cross-sectional view of a second embodiment of the present invention.
Figure 7:
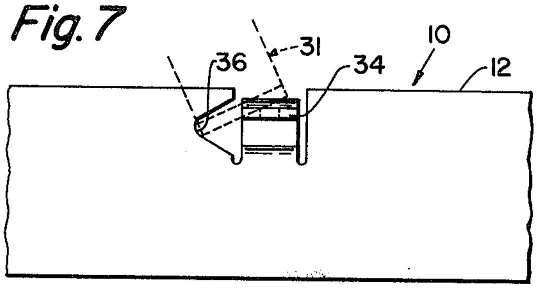
FIG. 7 is a top elevational view of a portion of the spring strip shown in the FIG. 6 embodiment.
Figure 8:
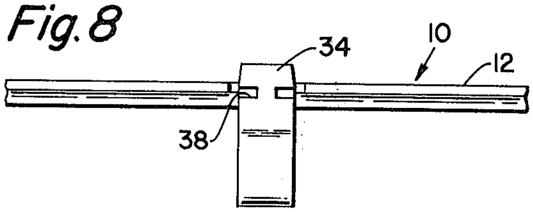
FIG. 8 is a side elevational view in partial cross-section of the second embodiment.

A second embodiment is depicted in FIGS. 6–8. In this embodiment, the generally U-shaped spring finger 16 is again attached to body portion 12 by one of the arms of the "U". However, the other of the "U" arms 18 is configured to provide a projecting abutment 32. The arms of the spring finger 16 will collapse toward one another as the strip 10 is pushed through apertures 22, re-expanding to a size larger than that of the opening once the projection is through.

In this embodiment the first staging position is as shown in dotted lines in FIG. 6. The spring finger is wedged in aperture 22 by means of its one arm 17 and projection 32. Liner 24 is secured against lateral displacement and body portion 12 is spaced from front side 21 of the door panel 20 such that the gasket 14 may be positioned around the periphery of the door. As in the previous embodiment, the spring strips 10 may now be engaged by a structural member (not shown) to either, individually sequentially or nearly simultaneously, move the strips to the second staging position in which the gasket 14 and liner 24 are resiliently but firmly clamped to the door panel 20.

In this embodiment, the means for releasing the clamping to permit gasket replacement comprises a portion 34 of leg 18 which extends above the surface of the body 12. In addition, a recess 36 is provided in the body 12 to provide a surface against which leverage may be applied to extension 34 by a screwdriver or the like, to collapse the expansion finger 16. Extension 34 preferably has a partial slit 38 to permit upward leverage as well as inward leverage. This will facilitate movement of retainer strip 10 to its first staging position for gasket or liner replacement.

Figure 9:
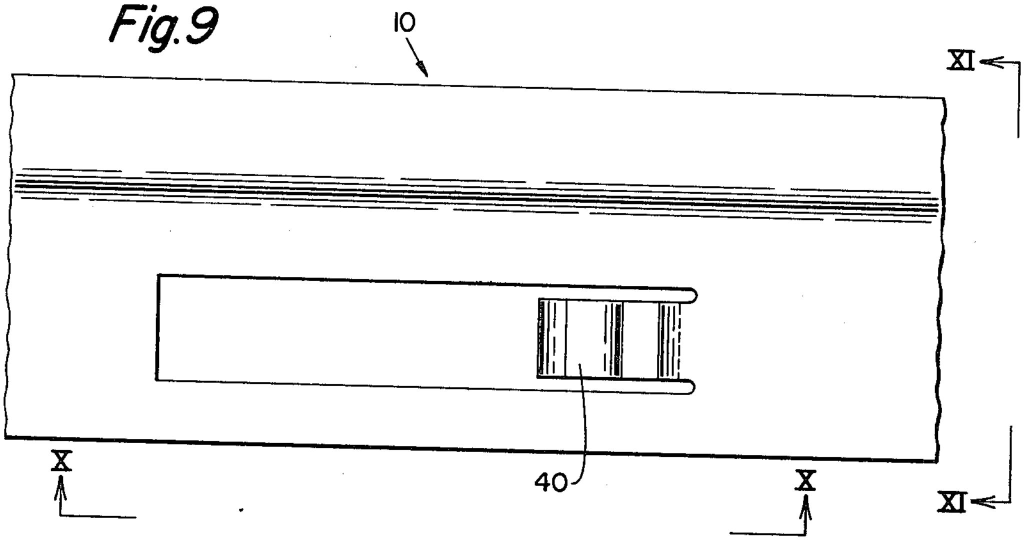
FIG. 9 is a top elevational view of a portion of yet a third embodiment of the present invention.
Figure 10:
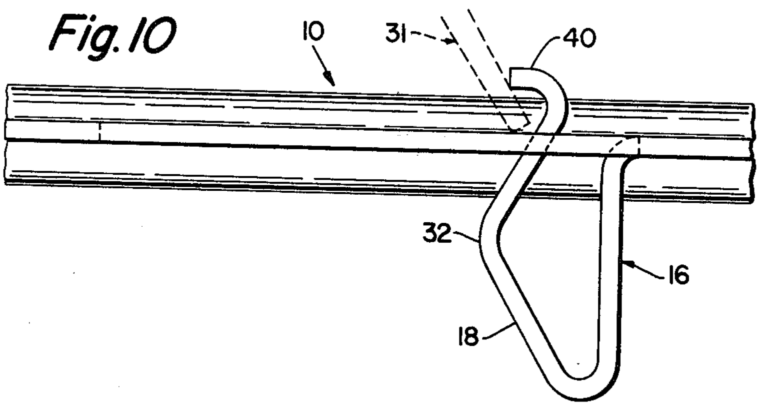
FIG. 10 is a side elevation of the third embodiment of the spring retainer strip as seen from line X—X in FIG. 9.
Figure 11:
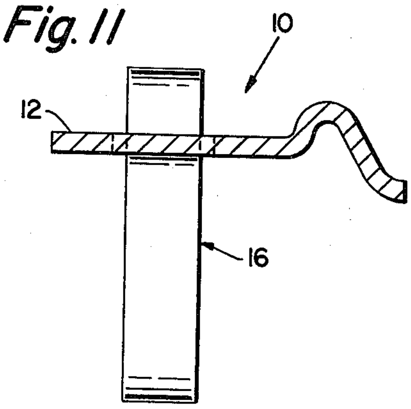
FIG. 11 is an end elevational view of the third embodiment as viewed along line XI—XI in FIG. 9.

Yet a third embodiment is depicted in FIGS. 9–11. This embodiment is similar to the previous one with but two exceptions. The expansion fingers 16 are turned ninety degrees with respect to the body 12. This orientation of expansion fingers 16 is preferred due to the material savings. Further, in this embodiment the unclamping means comprises a hook 40 formed atop arm 18. The hook will permit both upward and inward leverage to be applied as in the previous embodiment so that the retainer strip may be moved to the first staging position.

In utilizing the assembly method of the present invention, the liner 24 is positioned on (or adjacent, depending whether the door panel is extending horizontally or vertically) the panel 20 and the two sets of apertures 26 and 22 are aligned. The spring retainer strips 10 are positioned with the fingers 16 positioned within the apertures and the body portion 12 spaced from the front side 21 of the refrigerator door panel 20 (in the first staging position). Gasket 14 may then be positioned with a portion 15 of the gasket underlying the body portion 12. The retainer strips 10 are then moved to a second position either sequentially, or preferredly, simultaneously, by exerting a force on the strips (i.e., the strips are moved to the second staging position). In this position, the spring retainer strips resiliently, but firmly clamp the gasket and liner to the refrigerator door.

Various changes, modifications or alternatives will become apparent to those skilled in the art after reading the foregoing disclosure. Accordingly, it is intended that all such changes, modifications or alternatives as come within the scope of the appended claims be considered part of this invention.

I claim:

1. A spring retainer strip for releasably securing a liner and a gasket to a refrigerator door panel said door panel having a plurality of apertures which require blind-bore installation and removal, said spring strip comprising a generally rectangular body portion with a length which is substantially equal to the length of the gasket to be secured and a width substantially less than the gasket width; a plurality of spring fingers spaced along and extending from one side face of the body portion, said fingers being adapted to be registered with and received in the apertures of the refrigerator door panel as well as in corresponding apertures in the liner, the apertures in the panel and liner have the same general spacing arrangement as said fingers, each of said fingers having a first segment extending generally outwardly from the body portion and a second segment extending at least partially in the direction of said body portion, each of the fingers and said body portion being positively positionable in either of a first or a second position by the spring fingers coacting with the door panel and the apertures therein, in said first position the fingers retaining the liner against lateral movement while the body portion is spaced from said liner by a distance greater than the thickness of the gasket permitting positioning adjustments of the gasket, in said second position said body portion and said second segment cooperating to clamping engage the liner and the gasket to the refrigerator door panel; and means engageable from the side face of the body portion opposite to said first side face which permits said spring retainer strip to be moved from said second position to said first position to be released to permit gasket and liner removal, replacement and adjustment.

2. The spring retainer strip of claim 1 wherein each spring finger comprises a generally U-shaped member which is attached by one arm of the U to the body portion.

3. The spring retainer of claim 2 wherein the body portion and the spring finger forms a bi-stable spring, said first and second positions constituting the two positions of the bi-stable spring.

4. The spring retainer strip of claim 3 wherein the means to permit unclamping comprises a series of apertures in the body portion adjacent to the junction with the U-shaped finger member, said apertures engageable by a tool to permit the bi-stable spring to be deflected between its two positions.

5. The spring retainer strip of claim 2 wherein the means to permit said clamping to be released comprises a hook formed at the end of the other arm of the U-shaped finger, said other arm projecting through said body portion and positioning said hook adjacent said opposite side face.

6. The spring retainer strip of claim 2 wherein the U-shaped finger comprises a resilient expansion member which collapses as it is pushed through the aperture in the refrigerator door panel and re-expands to a dimension greater than the length of the aperture.

7. The spring retainer strip of claim 1 wherein said body portion is generally flat through most of its width with one edge being bent upwardly above the plane of the flat portion and then downwardly below said plane.

8. A method of attaching a liner and resilient gasket to a refrigerator door comprising the steps of providing a refrigerator door with a plurality of spaced apertures about the periphery of its one side; providing a refrigerator door liner with a plurality of apertures which have a similar spacing arrangement to the arrangement of apertures in the door; providing a resilient gasket of sufficient length to extend generally about the periphery of said one side; providing a plurality of spring retainer strips each of which extends substantially the length or width of the refrigerator door and each having a plurality of spring fingers spaced in accordance with the spacing of the apertures in the one side of the door; positioning the liner on the refrigerator door so that the respective apertures are generally aligned; positioning the spring retainer strips so the spring fingers project through the holes in the liner and the refrigerator door such that the spring retainer strips are in a first staging position positively positioned by the spring fingers coacting with the door and the operations therein; aligning the gasket around the periphery of said one side such that a portion thereof underlies the spring retainer strips; moving the spring retainer strips to a second staging position wherein the gasket and liner are resiliently, but positively, retained about the outer periphery of said one side of the refrigerator door.

9. The method of claim 8 wherein the movement of the spring retainer strips to the second staging position is accomplished nearly simultaneously.

* * * * *